US012798182B2

(12) United States Patent
Woodruff et al.

(10) Patent No.: US 12,798,182 B2
(45) Date of Patent: *Nov. 17, 2026

(54) THREE-DIMENSIONAL PRINTING WITH PIGMENT REACTANTS

(71) Applicant: PERIDOT PRINT LLC, Palo Alto, CA (US)

(72) Inventors: Shannon Reuben Woodruff, San Diego, CA (US); Emre Hiro Discekici, San Diego, CA (US); Graciela Emma Negri Jimenez, San Diego, CA (US)

(73) Assignee: Peridot Print LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/267,177

(22) Filed: Jul. 11, 2025

(65) Prior Publication Data

US 2025/0340011 A1 Nov. 6, 2025

Related U.S. Application Data

(63) Continuation of application No. 19/074,417, filed on Mar. 9, 2025, which is a continuation of application (Continued)

(51) Int. Cl.

*B29C 64/165* (2017.01)
*B22F 10/14* (2021.01)

(Continued)

(52) U.S. Cl.

CPC ............ *B29C 64/165* (2017.08); *B22F 10/14* (2021.01); *B29C 64/153* (2017.08); *B33Y 10/00* (2014.12);

(Continued)

(58) Field of Classification Search

CPC .................................................... B29C 64/165

See application file for complete search history.

(56) References Cited

U.S. PATENT DOCUMENTS

| | | | | |
|---|---|---|---|---|
| 5,876,581 A | | 3/1999 | Itaya et al. | |
| 5,976,230 A | * | 11/1999 | Askeland | B41J 2/2114 106/31.27 |

(Continued)

FOREIGN PATENT DOCUMENTS

| | | |
|---|---|---|
| WO | 2007/114895 A2 | 10/2007 |
| WO | 2015/108544 A1 | 7/2015 |

(Continued)

OTHER PUBLICATIONS

Jones, Rebecca, Weeks 4 and 5: Inorganic Pigment Syntheses and Characterization, Austin Peay State University, Aug. 11, 2011, available @ <https://www.ionicviper.org/system/files/Pigment+Syntheses+and+Qualitative+Analysis.pdf>. (Year: 2011).*

(Continued)

*Primary Examiner* — Xiao S Zhao
*Assistant Examiner* — Nicholas J Chidiac
(74) *Attorney, Agent, or Firm* — Dierker & Kavanaugh, P.C.

(57) ABSTRACT

This disclosure describes multi-fluid kits for three-dimensional printing, three-dimensional printing kits, and methods of making three-dimensional printed articles. In one example, a multi-fluid kit for three-dimensional printing can include a fusing agent, a first reactive agent, and a second reactive agent. The fusing agent can include water and a radiation absorber. The radiation absorber can absorb radiation energy and convert the radiation energy to heat. The first reactive agent can include water and a dissolved first pigment reactant. The second reactive agent can include water and a dissolved second pigment reactant. The second pig- (Continued)

ment reactant can be reactive with the first pigment reactant to form a water-insoluble pigment.

12 Claims, 4 Drawing Sheets

Related U.S. Application Data

No. 17/293,266, filed as application No. PCT/US2019/041845 on Jul. 15, 2019, now Pat. No. 12,251,874.

(51) Int. Cl.

*B29C 64/153* (2017.01)
*B33Y 10/00* (2015.01)
*B33Y 70/00* (2020.01)
*B29K 105/00* (2006.01)

(52) U.S. Cl.

CPC ...... *B33Y 70/00* (2014.12); *B29K 2105/0032* (2013.01); *B29K 2105/005* (2013.01); *B29K 2995/0026* (2013.01)

(56) References Cited

U.S. PATENT DOCUMENTS

| | | | |
|---|---|---|---|
| 10,434,709 | B2 | 10/2019 | Kabalnov et al. |
| 10,781,323 | B2 | 9/2020 | Ganapathiappan et al. |
| 11,104,816 | B2 | 8/2021 | Ganapathiappan et al. |
| 12,070,899 | B2 * | 8/2024 | Woodruff .............. B29C 64/165 |
| 2009/0185992 | A1 | 7/2009 | Conan et al. |
| 2010/0007692 | A1 | 1/2010 | Vanmaele et al. |
| 2010/0133487 | A1 | 6/2010 | Kawamoto et al. |
| 2012/0222569 | A1 | 9/2012 | Mcneil et al. |
| 2012/0222575 | A1 | 9/2012 | Mcneil et al. |
| 2014/0205664 | A1 | 7/2014 | Ketteler et al. |
| 2015/0224717 | A1 | 8/2015 | Kritchman |
| 2017/0023889 | A1 | 1/2017 | Onishi et al. |
| 2017/0217103 | A1 | 8/2017 | Babaei et al. |
| 2017/0239889 | A1 * | 8/2017 | Ganapathiappan .... B33Y 10/00 |
| 2018/0015664 | A1 | 1/2018 | Kabalnov et al. |
| 2020/0354592 | A1 | 11/2020 | Ganapathiappan et al. |

FOREIGN PATENT DOCUMENTS

| | | | |
|---|---|---|---|
| WO | 2016/169617 | A1 | 10/2016 |
| WO | 2018/080456 | A1 | 5/2018 |
| WO | 2019/108273 | A1 | 6/2019 |

OTHER PUBLICATIONS

Jones, Rebecca M., Inorganic Pigment Syntheses, Austin Peay State University, Aug. 11, 2011, available @ <https://www.ionicviper.org/system/files/Pigment+Syntheses+and+Qualitative+Analysis.pdf>, 2011, 5 pages.

Lui, Feng, et al., Preparation of the Polymerizable Titania Oriented to 3D Printing and the Laser-Induced Crystallization, Rapid Prototyping Journal, 24(9), Oct. 23, 2018, DOI: 10.1108/RPJ-03-2017-0041, 7 pages.

* cited by examiner

THREE-DIMENSIONAL PRINTING WITH PIGMENT REACTANTS

CROSS REFERENCE TO RELATED APPLICATIONS

This application is a continuation of U.S. application Ser. No. 19/074,417, filed Mar. 9, 2025, which itself is a continuation of U.S. application Ser. No. 17/293,266, filed May 12, 2021 (now U.S. Pat. No. 12,251,874), which itself is a 371 National Stage Entry of International Application No. PCT/US2019/041845, filed on Jul. 15, 2019, the contents of each of which are incorporated herein by reference in their entireties.

BACKGROUND

Methods of three-dimensional (3D) digital printing, a type of additive manufacturing, have continued to be developed over the last few decades. However, systems for 3D printing have historically been very expensive, though those expenses have been coming down to more affordable levels recently. In general, 3D printing technology can shorten the product development cycle by allowing rapid creation of prototype models for reviewing and testing. Unfortunately, the concept has been somewhat limited with respect to commercial production capabilities because the range of materials used in 3D printing is likewise limited. Accordingly, it can be difficult to 3D print functional parts with desired properties such as mechanical strength, visual appearance, and so on. Nevertheless, several commercial sectors such as aviation and the medical industry have benefitted from the ability to rapidly prototype and customize parts for customers.

DETAILED DESCRIPTION

Figure 1:
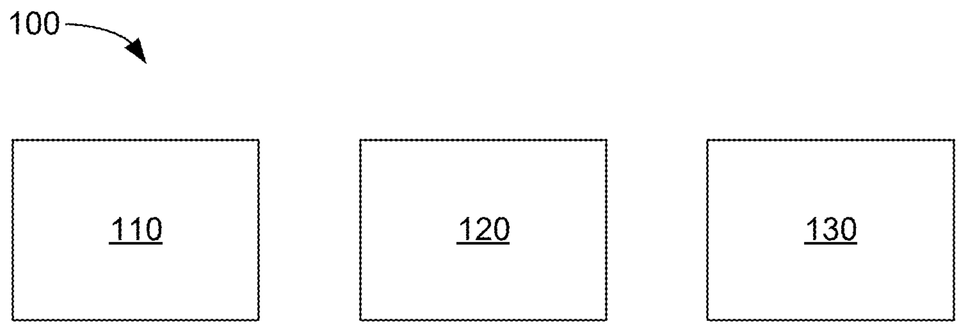
FIG. 1 is a schematic view of an example multi-fluid kit for three-dimensional printing in accordance with examples of the present disclosure.

The present disclosure describes multi-fluid kits for three-dimensional printing, three-dimensional printing kits, and methods of making three-dimensional printed articles. In one example, a multi-fluid kit for three-dimensional printing can include a fusing agent, a first reactive agent, and a second reactive agent. The fusing agent can include water and a radiation absorber. The radiation absorber can absorb radiation energy and convert the radiation energy to heat. The first reactive agent can include water and a first dissolved pigment reactant. The second reactive agent can include water and a dissolved second pigment reactant. The second pigment reactant can be reactive with the first pigment reactant to form a water-insoluble pigment. In some examples, the first pigment reactant, the second pigment reactant, or both can include a metal salt. In further examples, the first pigment reactant or the second pigment reactant can include $FeSO_4$, NaOH, $Na_2SO_4$, $BaCl_2$, $CuSO_4$, $NaHCO_3$, $Na_2CO_3$, $Na_2CrO_4$, $K_2CrO_4$, $ZnSO_4$, $ZnCl_2$, $K_3[Fe(CN)_6]$, or a combination thereof. In certain examples, the water-insoluble pigment can be iron oxide red, barium white, basic copper carbonate, zinc chrome yellow, or Prussian blue. In some examples, the first pigment reactant can be present at a concentration from about 0.01 mol/L to about 0.5 mol/L with respect to the volume of the first reactive agent and the second pigment reactant can be present at a concentration from about 0.01 mol/L to about 0.5 mol/L with respect to the volume of the second reactive agent. In other examples, the fusing agent can be colorless. In yet other examples, the multi-fluid kit can also include a third reactive agent that includes a dissolved third pigment reactant and a fourth reactive agent that includes a dissolved fourth pigment reactant, wherein the third pigment reactant is reactive with the fourth pigment reactant to form a second water-insoluble pigment.

The present disclosure also describes three-dimensional printing kits. In one example, a three-dimensional printing kit can include a powder bed material, a first reactive agent, and a second reactive agent. The powder bed material can include polymer particles. The first reactive agent can be selectively applied to the powder bed material, and the first reactive agent can include water and a dissolved first pigment reactant. The second reactive agent can also be selectively applied to the powder bed material, and the second reactive agent can include water and a dissolved second pigment reactant. The second pigment reactant can be reactive with the first pigment reactant to form a water-insoluble pigment. In further examples, the three-dimensional printing kit can also include a fusing agent to selectively apply to the powder bed material. The fusing agent can include water and a radiation absorber, wherein the radiation absorber absorbs radiation energy and converts the radiation energy to heat. In other examples, the polymer particles can include polyamide 6, polyamide 9, polyamide 11, polyamide 12, polyamide 66, polyamide 612, thermoplastic polyamide, polyamide copolymer, polyethylene, thermoplastic polyurethane, polypropylene, polyester, polycarbonate, polyether ketone, polyacrylate, polystyrene, wax, or a combination thereof. In still other examples, the first pigment reactant or the second pigment reactant can include $FeSO_4$, NaOH, $Na_2SO_4$, $BaCl_2$, $CuSO_4$, $NaHCO_3$, $Na_2CO_3$, $Na_2CrO_4$, $K_2CrO_4$, $ZnSO_4$, $ZnCl_2$, $K_3[Fe(CN)_6]$, or a combination thereof, and the water-insoluble pigment can be iron oxide red, barium white, basic copper carbonate, zinc chrome yellow, or Prussian blue.

The present disclosure also describes methods of making three-dimensional printed articles. In one example, a method of making a three-dimensional printed article can include iteratively applying individual build material layers of polymer particles to a powder bed. A fusing agent can be selectively jetted onto the individual build material layers based on a three-dimensional object model. The fusing agent can include water and a radiation absorber. A first reactive agent can be selectively jetted onto the individual build material layers based on the three-dimensional object model. The first reactive agent can include water and a dissolved first pigment reactant. A second reactive agent can also be selectively jetted onto the individual build material layers based on the three-dimensional object model. The second reactive agent can include water and a dissolved second pigment reactant. The second pigment reactant can react with the first pigment reactant to form a water-insoluble pigment. The powder bed can be exposed to energy to selectively fuse the polymer particles in contact with the radiation absorber to form a fused polymer matrix at individual build material layers. In other examples, the first pigment reactant or the second pigment reactant can include $FeSO_4$, NaOH, $Na_2SO_4$, $BaCl_2$, $CuSO_4$, $NaHCO_3$, $Na_2CO_3$, $NazCrO_4$, $K_2CrO_4$, $ZnSO_4$, $ZnCl_2$, $K_3[Fe(CN)_6]$, or a combination thereof, and the water-insoluble pigment can be iron oxide red, barium white, basic copper carbonate, zinc chrome yellow, or Prussian blue. In further examples, the fusing agent can be colorless. In still further examples, the fusing agent may not be jetted onto the same areas where the first reactive agent and the second reactive agent are jetted.

The multi-fluid kits, three-dimensional printing kits and methods described herein can be used to make three-dimensional (3D) printed articles that are colored by an in-situ formed pigment. As mentioned above, a first reactive agent and a second reactive agent can be used together in the 3D printing process. The first and second reactive agents can include chemical compounds that, when brought together, can react to form a colored pigment. In some cases, the reactants can be water-soluble on their own, but the pigment formed by the reaction can be water insoluble. Therefore, the reactants can be easily formulated in an aqueous reactive agent that can be jetted using fluid jetting architecture such as inkjet printing architecture. This can be easier than making colored jettable agents that include pigments, because processes for dispersing pigments in jettable agents is often complicated and involves milling, adding dispersing agents, ensuring that the dispersing agents do not interact with other components in the fluid, etc. Pigmented jettable agents often experience aggregation of pigment particles, which can interfere with jetting. In contrast, the pigment reactants described herein can be easily dissolved in the first and second reactive agents and the reactive agents can have good jetting ability.

The 3D printing processes described herein generally include applying a fusing agent to a powder bed material that includes polymer particles. The fusing agent can include a radiation absorber, which can be a compound or material that absorbs radiation energy (such as UV or infrared radiation) and converts the energy to heat. After applying the fusing agent, and radiation source is used to irradiate the powder bed. The areas of the powder bed where the fusing agent was applied can be selectively heated to a melting or softening point temperature of the polymer particles so that the polymer particles fuse together to form a solid layer of the final 3D printed article.

The first reactive agent and second reactive agent can be selectively jetted onto the powder bed in any locations where coloring is desired. For example, the reactive agents can be jetted on certain areas of the powder bed to form colored text or images. Alternatively, the reactive agents can be jetted across the entire area to be fused to make the final 3d printed article a uniform color, or the reactive agents can be selectively jetted in areas to color certain portions of the final 3D printed article. When the first reactive agent and the second reactive agent are jetted onto the same area of the powder bed, the agents can mix together and the first pigment reactant can react with the second pigment reactant. This reaction can produce an insoluble colored pigment in-situ in the powder bed. Thus, colored areas can be formed using the colored pigment. As one example, the pigment referred to as "Prussian blue" can be formed by reacting $FeSO_4$ with $K_3[Fe(CN)_6]$. These reactants can be dissolved in a first and second reactive agent, respectively. The reaction forms $KFe[Fe(CN)_6]_{(s)}$, which is the insoluble blue pigment Prussian blue. In some examples, multiple pairs of reactive agents can be used to form multiple differently colored pigments. These can be used to make 3D printed articles with multiple colors.

3D printed articles may also be colored through the use of dye-based coloring agents. However, dyes can sometimes be inferior to pigments because dyes are not as thermally stable or water-fast, and dyes can migrate within the polymer matrix of the 3D printed article. Many dyes degrade at the temperature used during the 3D printing process. The in-situ formed pigments described herein can be more thermally stable, water-fast, and can remain stationary in the polymer matrix. In some examples, the reactive agents can be jetted onto the individual layers of powder bed material before the polymer particles have been fused together. Thus, the colored pigment can form between and around the polymer particles. Then, when the polymer particles are melted and fused together, the pigment particles can be locked in the polymer matrix.

Multi-Fluid Kits for Three-Dimensional Printing

With this description in mind, FIG. 1 shows a schematic of an example multi-fluid kit for three-dimensional printing 100. The kit includes a fusing agent 110, a first reactive agent 120, and a second reactive agent 130. The fusing agent can include water and a radiation absorber. The radiation absorber can absorb radiation energy and convert the radiation energy to heat. The first reactive agent can include water and a dissolved first pigment reactant. The second reactive agent can include water and a dissolved second pigment reactant. The second pigment reactant can be reactive with the first pigment reactant to form a water-insoluble pigment.

As used herein, "water-soluble" refers to materials that can be dissolved in water at a concentration from about 5 wt % to about 99 wt % of the dissolved material with respect to the entire weight of the solution. The solution of a water-soluble material can be fully transparent without any phase separation. Materials that are not water-soluble can be referred to as "water-insoluble."

Figure 2:
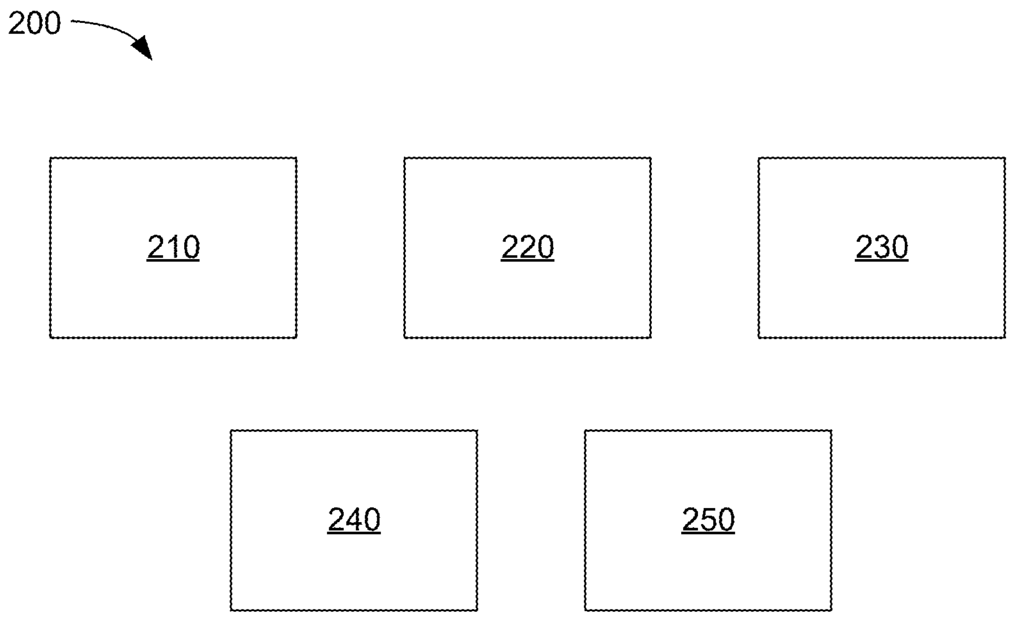
FIG. 2 is a schematic view of another example multi-fluid kit for three-dimensional printing in accordance with examples of the present disclosure.

FIG. 2 shows another example multi-fluid kit for three-dimensional printing. This example includes a fusing agent 210, a first reactive agent 220, and a second reactive agent 230. The fusing agent can include water and a radiation absorber. The radiation absorber can absorb radiation energy and convert the radiation energy to heat. The first reactive agent can include water and a dissolved first pigment reactant. The second reactive agent can include water and a dissolved second pigment reactant. The second pigment reactant can be reactive with the first pigment reactant to form a water-insoluble pigment. This multi-fluid kit in this example can also include a third reactive agent 240 and a fourth reactive agent 250. The third reactive agent can include a dissolved third pigment reactant and the fourth reactive agent can include a dissolved fourth pigment reactant. The third pigment reactant and the fourth pigment reactant can be reactive with one another to form a second water-insoluble pigment. Thus, two different pigments can be formed by using two pairs of reactive agents. In further examples, additional pairs of reactive agents can be included to form more pigments to generate any of a number of colors that may be formed during 3D printing.

The ingredients and properties of the fusing agent, reactive agents, and detailing agent are described in more detail below.

Three-Dimensional Printing Kits

The present disclosure also describes three-dimensional print kits that can include a combination of fluid agents and powder bed material. In some examples, the three-dimensional printing kits can include a powder bed material that includes polymer particles and reactive agents for forming pigments as described above.

Figure 3:
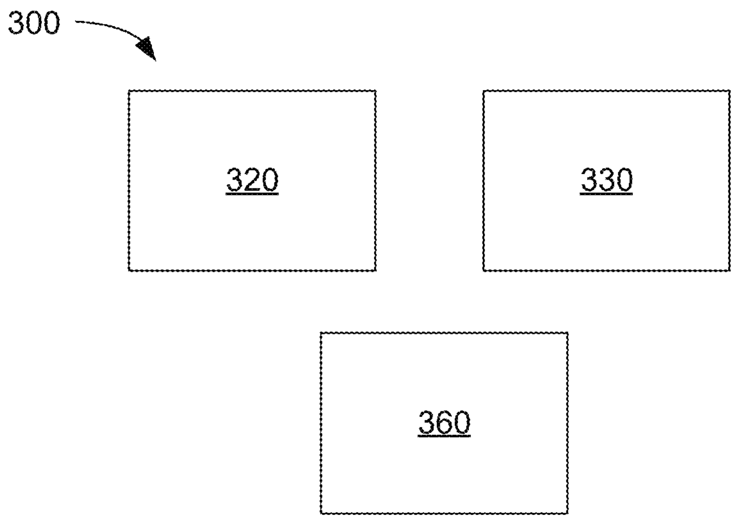
FIG. 3 is a schematic view of an example three-dimensional printing kit in accordance with examples of the present disclosure.

FIG. 3 is a schematic of one example three-dimensional printing kit 300. This three-dimensional printing kit includes a powder bed material 360, a first reactive agent 320, and a second reactive agent 330. The powder bed material can include polymer particles. The first reactive agent can include water and a dissolved first pigment reactant. The second reactive agent can include water and a dissolved second pigment reactant. The second pigment reactant can be reactive with the first pigment reactant to form a water-insoluble pigment.

Figure 4:
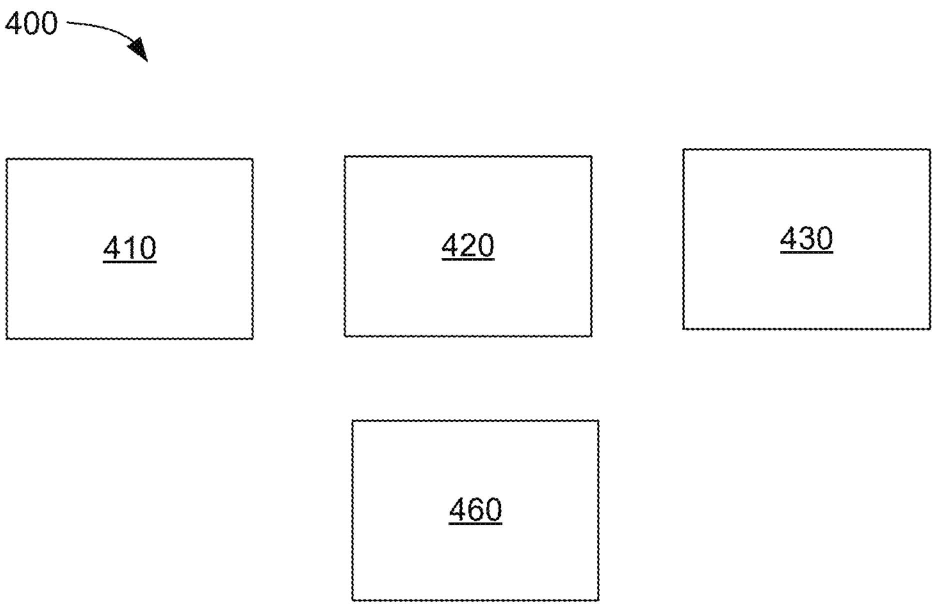
FIG. 4 is a schematic view of another example three-dimensional printing kit in accordance with examples of the present disclosure.

Another example is shown in FIG. 4. This figure shows an example three-dimensional printing kit 400 that includes a powder bed material 460, a fusing agent 410, a first reactive agent 420, and a second reactive agent 430. The powder bed material can include polymer particles. The fusing agent can include water and a radiation absorber that can absorb radiation energy and convert the radiation energy to heat. The first reactive agent can include water and a dissolved first pigment reactant. The second reactive agent can include water and a dissolved second pigment reactant. The second pigment reactant can be reactive with the first pigment reactant to form a water-insoluble pigment.

In further examples, the three-dimensional printing kits, as well as the previously mentioned multi-fluid kit for three-dimensional printing, can further include other fluids, such as coloring agents (other than the reactive colorants formed in-situ), detailing agents, or the like. A detailing agent, for example, can include a detailing compound, which is a compound that can reduce the temperature of powder bed material onto which the detailing agent is applied. In some examples, the detailing agent can be applied around edges of the area where the fusing agent is applied. This can prevent powder bed material around the edges from caking due to heat from the area where the fusing agent was applied. The detailing agent can also be applied in the same area where fusing was applied in order to control the temperature and prevent excessively high temperatures when the powder bed material is fused.

Figure 5A:
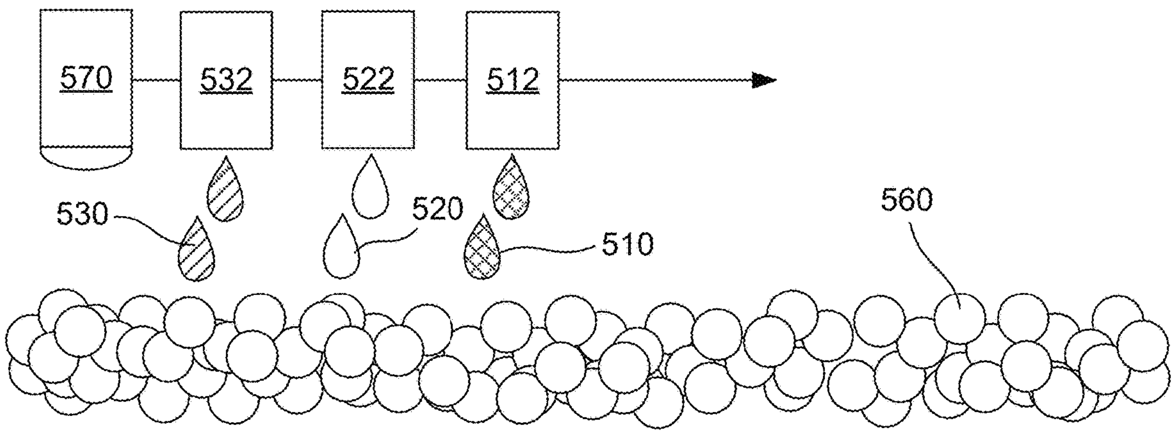
FIGS. 5A-5C show a schematic view of an example three-dimensional printing process using an example three-dimensional printing kit in accordance with examples of the present disclosure.
Figure 5B:
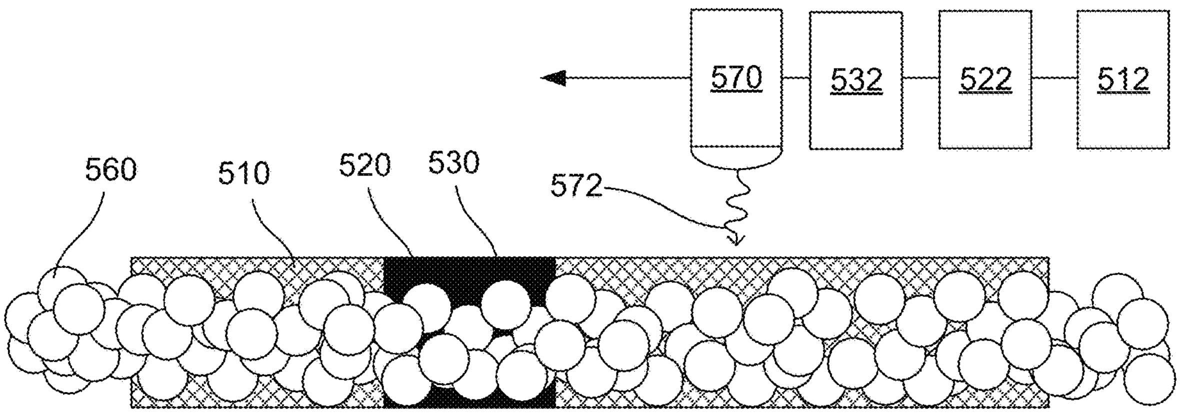
Figure 5C:
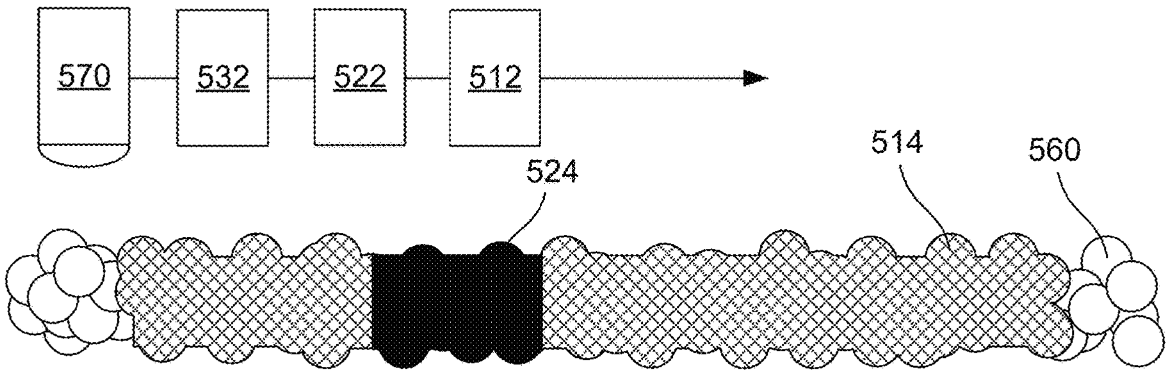

FIGS. 5A-5C illustrate one example of using the three-dimensional printing kits to form a 3D printed article. In FIG. 5A, a fusing agent 510, a first reactive agent 520, and a second reactive agent 530 are jetted onto a layer of powder bed material made up of polymer particles 560. The fusing agent is jetted from a fusing agent ejector 512, the first reactive agent is jetted from a first reactive agent ejector 522, and the second reactive agent is jetted from a second reactive agent ejector 532. These fluid ejectors can move across the layer of powder bed material to selectively jet the fusing agent on areas that are to be fused, while the reactive agents can be jetted onto areas where colored pigment is to be formed in-situ. A radiation source 570 can also move across the layer of powder bed material.

FIG. 5B shows the layer of powder bed material after the fusing agent 510, the first reactive agent 520, and the second reactive agent 530 have been jetted onto the powder bed. The fusing agent has been jetted in an area of the polymer powder layer that is to be fused. The first and second reactive agents were both jetted onto a smaller subset of the area where the fusing agent was jetted. When the first reactive agent and the second reactive agent mix after they are jetted in the same location, the first pigment react reacts with the second pigment. This forms a colored pigment, which is indicated in the figure by the solid shading of the fluid agents in this area. In this figure, the radiation source 570 is shown emitting radiation 572 toward the layer of polymer particles 560. The fusing agent can include a radiation absorber that can absorb this radiation and convert the radiation energy to heat.

FIG. 5C shows the layer of powder bed material with a fused portion 514 where the fusing agent was jetted. This portion has reached a sufficient temperature to fuse the polymer particles together to form a solid polymer matrix. The fused portion includes a colored area 524 where pigment was formed in-situ by the reaction of the first pigment reactant and the second pigment reactant in the first reactive agent and second reactive agent, respectively. The process shown in FIGS. 5A-5C can be repeated with additional layers of powder bed material to build up a 3D printed article layer by layer. As explained above, the first and second reactive agents can be jetted in areas where colored pigment is desired to make a 3D printed article having colored portions.

Powder Bed Material

The powder bed material can include polymer particles having a variety of shapes, such as substantially spherical particles or irregularly-shaped particles. In some examples, the polymer powder can be capable of being formed into 3D printed objects with a resolution of about 20 μm to about 100 μm, about 30 μm to about 90 μm, or about 40 μm to about 80 μm. As used herein, "resolution" refers to the size of the smallest feature that can be formed on a 3D printed object. The polymer powder can form layers from about 20 μm to about 100 μm thick, allowing the fused layers of the printed part to have roughly the same thickness. This can provide a resolution in the z-axis (i.e., depth) direction of about 20 μm to about 100 μm. The polymer powder can also have a sufficiently small particle size and sufficiently regular particle shape to provide about 20 μm to about 100 μm resolution along the x-axis and y-axis (i.e., the axes parallel to the top surface of the powder bed). For example, the polymer powder can have an average particle size from about 20 μm to about 100 μm. In other examples, the average particle size can be from about 20 μm to about 50 μm. Other resolutions along these axes can be from about 30 μm to about 90 μm or from 40 μm to about 80 μm.

The polymer powder can have a melting or softening point from about 70° C. to about 350° C. In further examples, the polymer can have a melting or softening point from about 150° C. to about 200° C. A variety of thermoplastic polymers with melting points or softening points in these ranges can be used. For example, the polymer powder can be polyamide 6 powder, polyamide 9 powder, polyamide 11 powder, polyamide 12 powder, polyamide 6,6 powder, polyamide 612, thermoplastic polyamide, polyamide copolymer powder, polyethylene powder, wax, thermoplastic polyurethane powder, acrylonitrile butadiene styrene powder, amorphous polyamide powder, polymethylmethacrylate powder, ethylene-vinyl acetate powder, polyarylate powder, silicone rubber, polypropylene powder, polyester powder, polycarbonate powder, copolymers of polycarbonate with acrylonitrile butadiene styrene, copolymers of polycarbonate with polyethylene terephthalate polyether ketone powder, polyacrylate powder, polystyrene powder, or mixtures thereof. In a specific example, the polymer powder can be polyamide 12, which can have a melting point from about 175° C. to about 200° C. In another specific example, the polymer powder can be thermoplastic polyurethane.

The powder bed material can also in some cases include a filler. The filler can include inorganic particles such as alumina, silica, fibers, carbon nanotubes, or combinations thereof. When the thermoplastic polymer particles fuse together, the filler particles can become embedded in the polymer, forming a composite material. In some examples, the filler can include a free-flow agent, anti-caking agent, or the like. Such agents can prevent packing of the powder particles, coat the powder particles and smooth edges to reduce inter-particle friction, and/or absorb moisture. In some examples, a weight ratio of thermoplastic polymer particles to filler particles can be from about 100:1 to about 1:2 or from about 5:1 to about 1:1.

Fusing Agents

The multi-fluid kits and three-dimensional printing kits described herein can include a fusing agent to be applied to the powder bed build material. The fusing agent can include a radiation absorber that can absorb radiant energy and convert the energy to heat. In certain examples, the fusing agent can be used with a powder bed material in a particular 3D printing process. A thin layer of powder bed material can be formed, and then the fusing agent can be selectively applied to areas of the powder bed material that are desired to be consolidated to become part of the solid 3D printed object. The fusing agent can be applied, for example, by printing such as with a fluid ejector or fluid jet printhead. Fluid jet printheads can jet the fusing agent in a similar way to an inkjet printhead jetting ink. Accordingly, the fusing agent can be applied with great precision to certain areas of the powder bed material that are desired to form a layer of the final 3D printed object. After applying the fusing agent, the powder bed material can be irradiated with radiant energy. The radiation absorber from the fusing agent can absorb this energy and convert it to heat, thereby heating any polymer particles in contact with the radiation absorber. An appropriate amount of radiant energy can be applied so that the area of the powder bed material that was printed with the fusing agent heats up enough to melt the polymer particles to consolidate the particles into a solid layer, while the powder bed material that was not printed with the fusing agent remains as a loose powder with separate particles.

In some examples, the amount of radiant energy applied, the amount of fusing agent applied to the powder bed, the concentration of radiation absorber in the fusing agent, and the preheating temperature of the powder bed (i.e., the temperature of the powder bed material prior to printing the fusing agent and irradiating) can be tuned to ensure that the portions of the powder bed printed with the fusing agent will be fused to form a solid layer and the unprinted portions of the powder bed will remain a loose powder. These variables can be referred to as parts of the "print mode" of the 3D printing system. Generally, the print mode can include any variables or parameters that can be controlled during 3D printing to affect the outcome of the 3D printing process.

Generally, the process of forming a single layer by applying fusing agent and irradiating the powder bed can be repeated with additional layers of fresh powder bed material to form additional layers of the 3D printed article, thereby building up the final object one layer at a time. In this process, the powder bed material surrounding the 3D printed article can act as a support material for the object. When the 3D printing is complete, the article can be removed from the powder bed and any loose powder on the article can be removed.

Accordingly, in some examples, the fusing agent can include a radiation absorber that is capable of absorbing electromagnetic radiation to produce heat. The radiation absorber can be colored or colorless. In various examples, the radiation absorber can be a pigment such as carbon black pigment, glass fiber, titanium dioxide, clay, mica, talc, barium sulfate, calcium carbonate, a near-infrared absorbing dye, a near-infrared absorbing pigment, a conjugated polymer, a dispersant, or combinations thereof. Examples of near-infrared absorbing dyes include aminium dyes, tetraaryldiamine dyes, cyanine dyes, pthalocyanine dyes, dithiolene dyes, and others. In further examples, radiation absorber can be a near-infrared absorbing conjugated polymer such as poly(3,4-ethylenedioxythiophene)-poly(styrenesulfonate) (PEDOT: PSS), a polythiophene, poly(p-phenylene sulfide), a polyaniline, a poly(pyrrole), a poly (acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that has a backbone with alternating double and single bonds. In many cases, the radiation absorber can have a peak absorption wavelength in the range of about 800 nm to about 1400 nm.

A variety of near-infrared pigments can also be used. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable near-infrared pigments.

Additional near-infrared pigments can include silicates. Silicates can have the same or similar counterions as phosphates. One non-limiting example can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. It is noted that the silicates described herein are not limited to counterions having a +2 oxidation state. Other silicate counterions can also be used to prepare other suitable near-infrared pigments.

In further examples, the radiation absorber can include a metal dithiolene complex. Transition metal dithiolene complexes can exhibit a strong absorption band in the 600 nm to 1600 nm region of the electromagnetic spectrum. In some examples, the central metal atom can be any metal that can form square planer complexes. Non-limiting specific examples include complexes based on nickel, palladium, and platinum.

In certain examples, the fusing agent can be colorless. This can allow for printing colored articles using the in-situ formed pigments described herein. Colorless fusing agents can include a radiation absorber that does not absorb wavelengths in the visible spectrum, or which weakly absorbs wavelengths in the visible spectrum. In some cases, the colorless fusing agent can actually have a faint color, but the faint color can be easily overpowered by the colored in-situ formed pigments so that the faint color of the fusing agent is not noticeable.

A dispersant can be included in the fusing agent in some examples. Dispersants can help disperse the radiation absorbing pigments described above. In some examples, the dispersant itself can also absorb radiation. Non-limiting examples of dispersants that can be included as a radiation absorber, either alone or together with a pigment, can include polyoxyethylene glycol octylphenol ethers, ethoxylated aliphatic alcohols, carboxylic esters, polyethylene glycol ester, anhydrosorbitol ester, carboxylic amide, polyoxyethylene fatty acid amide, poly(ethylene glycol) p-isooctylphenyl ether, sodium polyacrylate, and combinations thereof.

The amount of radiation absorber in the fusing agent can vary depending on the type of radiation absorber. In some examples, the concentration of radiation absorber in the fusing agent can be from about 0.1 wt % to about 20 wt %. In one example, the concentration of radiation absorber in the fusing agent can be from about 0.1 wt % to about 15 wt %. In another example, the concentration can be from about 0.1 wt % to about 8 wt %. In yet another example, the concentration can be from about 0.5 wt % to about 2 wt %. In a particular example, the concentration can be from about 0.5 wt % to about 1.2 wt %. In one example, the radiation absorber can have a concentration in the fusing agent such that after the fusing agent is jetted onto the polymer powder, the amount of radiation absorber in the polymer powder can be from about 0.0003 wt % to about 10 wt %, or from about 0.005 wt % to about 5 wt %, with respect to the weight of the polymer powder.

In some examples, the fusing agent can be jetted onto the polymer powder build material using a fluid jetting device, such as inkjet printing architecture. Accordingly, in some examples, the fusing agent can be formulated to give the fusing agent good jetting performance. Ingredients that can be included in the fusing agent to provide good jetting performance can include a liquid vehicle. Thermal jetting can function by heating the fusing agent to form a vapor bubble that displaces fluid around the bubble, and thereby forces a droplet of fluid out of a jet nozzle. Thus, in some examples the liquid vehicle can include a sufficient amount of an evaporating liquid that can form vapor bubbles when heated. The evaporating liquid can be a solvent such as water, an alcohol, an ether, or a combination thereof.

In some examples, the liquid vehicle formulation can include a co-solvent or co-solvents present in total at from about 1 wt % to about 50 wt %, depending on the jetting architecture. Further, a non-ionic, cationic, and/or anionic surfactant can be present, ranging from about 0.01 wt % to about 5 wt %. In one example, the surfactant can be present in an amount from about 1 wt % to about 5 wt %. The liquid vehicle can include dispersants in an amount from about 0.5 wt % to about 3 wt %. The balance of the formulation can be purified water, and/or other vehicle components such as biocides, viscosity modifiers, materials for pH adjustment, sequestering agents, preservatives, and the like. In one example, the liquid vehicle can be predominantly water.

In some examples, a water-dispersible or water-soluble radiation absorber can be used with an aqueous vehicle. Because the radiation absorber is dispersible or soluble in water, an organic co-solvent may not be present, as it may not be included to solubilize the radiation absorber. Therefore, in some examples the fluids can be substantially free of organic solvent, e.g., predominantly water. However, in other examples a co-solvent can be used to help disperse other dyes or pigments, or enhance the jetting properties of the respective fluids. In still further examples, a non-aqueous vehicle can be used with an organic-soluble or organic-dispersible fusing agent.

In certain examples, a high boiling point co-solvent can be included in the fusing agent. The high boiling point co-solvent can be an organic co-solvent that boils at a temperature higher than the temperature of the powder bed during printing. In some examples, the high boiling point co-solvent can have a boiling point above about 250° C. In still further examples, the high boiling point co-solvent can be present in the fusing agent at a concentration from about 1 wt % to about 4 wt %.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include 1-aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

Regarding the surfactant that may be present, a surfactant or surfactants can be used, such as alkyl polyethylene oxides, alkyl phenyl polyethylene oxides, polyethylene oxide block copolymers, acetylenic polyethylene oxides, polyethylene oxide (di) esters, polyethylene oxide amines, protonated polyethylene oxide amines, protonated polyethylene oxide amides, dimethicone copolyols, substituted amine oxides, and the like. The amount of surfactant added to the fusing agent may range from about 0.01 wt % to about 20 wt %. Suitable surfactants can include, but are not limited to, liponic esters such as Tergitol™ 15-S-12, Tergitol™ 15-S-7 available from Dow Chemical Company (Michigan), LEG-1 and LEG-7; Triton™ X-100; Triton™ X-405 available from Dow Chemical Company (Michigan); and sodium dodecylsulfate.

Various other additives can be employed to enhance certain properties of the fusing agent for specific applications. Examples of these additives are those added to inhibit the growth of harmful microorganisms. These additives may be biocides, fungicides, and other microbial agents, which can be used in various formulations. Examples of suitable microbial agents include, but are not limited to, NUOSEPT® (Nudex, Inc., New Jersey), UCARCIDE™ (Union carbide Corp., Texas), VANCIDE® (R.T. Vanderbilt Co., Connecticut), PROXEL® (ICI Americas, New Jersey), and combinations thereof.

Sequestering agents, such as EDTA (ethylene diamine tetra acetic acid), may be included to eliminate the deleterious effects of heavy metal impurities, and buffer solutions may be used to control the pH of the fluid. From about 0.01 wt % to about 2 wt %, for example, can be used. Viscosity modifiers and buffers may also be present, as well as other additives to modify properties of the fluid as desired. Such additives can be present at from about 0.01 wt % to about 20 wt %.

Reactive Agents

The first reactive agent and second reactive agent can include reactants that can react together to form a pigment. As used herein, "first" and "second" can be interchangeable when used with respect to the reactive agents and pigment reactants. Therefore, the terms "first" and "second" are used for convenience to differentiate between the reactive agents and do not imply any particular order or position of the reactive agents.

A variety of colored pigments can be made by chemically reacting multiple reactants, e.g., two, three, etc. In some examples, the reactants can be water-soluble. These reactants can be dissolved in aqueous reactive agents that can be jetted onto the powder bed material in the 3D printing methods described herein. Although the reactants can be soluble, the pigment formed by the reaction may be water-insoluble.

In some examples, the pigment can be formed by reacting two reactants. One reactant can be included in the first reactive agent and the other reactant can be included in the second reactive agent. In other examples, the pigment may be formed by a reaction involving three reactants, or four reactants, for example. In some cases, the additional reactants can be included individually in additional reactive agents. Alternatively, the reactants can be combined in two groups that will not react until the first reactive agent is mixed with the second reactive agent.

In certain examples, the first pigment reactant and/or the second pigment reactant can include a metal salt. Specific examples can include $FeSO_4$, NaOH, $Na_2SO_4$, $BaCl_2$, $CuSO_4$, $NaHCO_3$, $Na_2CO_3$, $Na_2CrO_4$, $K_2CrO_4$, $ZnSO_4$, $ZnCl_2$, $K_3[Fe(CN)_6]$, and combinations thereof. Several pigments can be formed by combining multiple reactants. Some examples of pigments that can be formed include iron oxide red, barium white, basic copper carbonate, zinc chrome yellow, Prussian blue, and others.

The concentration of the first and second pigment reactants in the first and second reactive agents can be selected depending on the desired amount of pigment to be formed and the volume of the first and second reactive agents that will be jetted onto the powder bed. Generally, when the first and second reactive agents are jetted onto the powder bed, the water and any volatile co-solvents in the agents will evaporate because of the high temperatures in the 3D printing process. Thus, the pigment reactants and any other solids will be left behind in the powder bed. The amount of pigment reactants that is applied to the powder bed can be adjusted by changing the amount of the reactive agents that is jetted onto the powder bed. In some examples, the concentration of the pigment reactants in first and second reactive agents can be within the solubility limits of the particular reactants, so that the reactants can be completely dissolved. In certain examples, the concentration of the first and second pigment reactants in the first and second reactive agents, respectively, and can be from about 0.01 mol/L to about 0.5 mol/L. In further examples, the concentration can be from about 0.02 mol/L to about 0.2 mol/L. In some cases, the first and second reactive agents may have equivalent molar concentrations of pigment reactants. In other cases, the concentrations can be different. In some examples, the concentrations can be stoichiometrically matched so that when an equivalent amount of the first and second reactive agents are applied to the powder bed, the appropriate stoichiometry of the reactants is present to form the pigment. In other examples the concentrations of the reactants in the reactive agents may not be stoichiometrically matched but the appropriate stoichiometry can still be applied to the powder bed by adjusting the amounts of the first and second reactive agent that are jetted onto the powder bed. In yet other examples, one of the reactants can be intentionally used in a stoichiometric excess.

In some examples, the water-insoluble pigment formed by the first and second pigment reactants can be Prussian blue. Prussian blue is an oxidation product of ferrous ferrocyanide salt. Specifically, Prussian blue has the chemical formula $KFe[Fe(CN)_6]_{(s)}$. Prussian blue can be formed using the following reaction:

$$K^+_{(aq)} + Fe^{2+}_{(aq)} + [Fe(CN)_6]^{3-}_{(aq)} \longrightarrow KFe[Fe(CN)_6]_{(s)}$$

In other examples, Prussian blue can also be formed using the following reaction:

$$K^+_{(aq)} + Fe^{2+}_{(aq)} + [Fe(CN)_6]^{4-}_{(aq)} \longrightarrow KFe[Fe(CN)_6]_{(s)}$$

In a specific example, Prussian blue can be formed by reacting $FeSO_4$ with $K_3[Fe(CN)_6]$. Thus, the first pigment reactant in the first reactive agent can be $FeSO_4$ and the second pigment reactant in the second reactive agent can be $K_3[Fe(CN)_6]$.

In another example, the water-soluble pigment can be iron oxide red. Iron oxide red has the chemical formula $Fe_2O_3$. This pigment can be formed using the following reaction:

$$2\,FeSO_4 + \tfrac{1}{2}\,O_2 + 4\,NaOH \longrightarrow Fe_2O_3 + 2\,Na_2SO_4 + H_2O$$

Therefore, in some examples the first pigment reactant can be $FeSO_4$ and the second pigment reactant can be NaOH.

In yet another example, the water-insoluble pigment can be barium white. The chemical formula of barium white is $BaSO_4$. This pigment can be made by the following reaction:

$$BaCl_2 + Na_2SO_4 \longrightarrow BaSO_4 + 2\,NaCl$$

Therefore, in some examples, the first pigment reactant can be $BaCl_2$ and the second pigment reactant can be $Na_2SO_4$.

In another example, the water-insoluble pigment can be basic copper carbonate. Basic copper carbonate has the chemical formula $Cu_2(OH)_2CO_3$. This pigment can be formed using the following reaction:

$$2\,CuSO_4 + 2\,Na_2SO_3 + H_2O \longrightarrow Cu_2(OH)_2CO_3 + 2\,Na_2SO_4 + CO_2$$

Therefore, in some examples, the first pigment reactant can be $CuSO_4$ and the second pigment reactant can be $Na_2CO_3$. In another example, basic copper carbonate can be formed using the following reaction:

$$2\,CuSO_4 + 4\,NaHCO_3 \longrightarrow Cu_2(OH)_2CO_3 + 2\,Na_2SO_4 + CO_2 + H_2O$$

Therefore, in other examples, the first pigment reactant can be $CuSO_4$ and the second pigment reactant can be $NaHCO_3$.

In still another example, the water-insoluble pigment can be zinc chrome yellow. Zinc chrome yellow has the chemical formula $ZnCrO_4$ and can be formed using the following reaction:

$$K_2CrO_4 + ZnSO_4 \longrightarrow ZnCrO_4 + K_2SO_4$$

Therefore, in some examples, the first pigment reactant can be $K_2CrO_4$ and the second pigment reactant can be $ZnSO_4$.

In further examples, the water-insoluble pigment can be any pigment that is formable by combining multiple water-soluble reactants, e.g., two, three, four, etc. The reactants can be formulated into multiple aqueous reactive agents as described above and the reactive agents can be jetted together onto the powder bed to form the water-insoluble pigment.

The reactive agents can also include ingredients to allow the reactive agents to be jetted by a fluid jet printhead. In some examples, the reactive agents can include ingredients such as those in the fusing agent described above. These ingredients can include a liquid vehicle, surfactant, dispersant, co-solvent, biocides, viscosity modifiers, materials for pH adjustment, sequestering agents, preservatives, and so on. These ingredients can be included in any of the amounts described above.

The reactive agents can include the pigment reactants as described above, and can further include a liquid vehicle formulation to carry the pigment reactants. The liquid vehicle formulation can be as described previously with respect to the fusing agent.

Detailing Agents

In further examples, multi-fluid kits or three-dimensional printing kits can include a detailing agent. The detailing agent can include a detailing compound. The detailing compound can be capable of reducing the temperature of the powder bed material onto which the detailing agent is applied. In some examples, the detailing agent can be printed around the edges of the portion of the powder that is printed with the fusing agent. The detailing agent can increase selectivity between the fused and unfused portions of the powder bed by reducing the temperature of the powder around the edges of the portion to be fused.

In some examples, the detailing compound can be a solvent that evaporates at the temperature of the powder bed. In some cases the powder bed can be preheated to a preheat temperature within about 10° C. to about 70° C. of the fusing temperature of the polymer powder. Depending on the type of polymer powder used, the preheat temperature can be in the range of about 90° C. to about 200° C. or higher. The detailing compound can be a solvent that evaporates when it comes into contact with the powder bed at the preheat temperature, thereby cooling the printed portion of the powder bed through evaporative cooling. In certain examples, the detailing agent can include water, co-solvents, or combinations thereof. Non-limiting examples of co-solvents for use in the detailing agent can include xylene, methyl isobutyl ketone, 3-methoxy-3-methyl-1-butyl acetate, ethyl acetate, butyl acetate, propylene glycol monomethyl ether, ethylene glycol mono tert-butyl ether, dipropylene glycol methyl ether, diethylene glycol butyl ether, ethylene glycol monobutyl ether, 3-Methoxy-3-Methyl-1-butanol, isobutyl alcohol, 1,4-butanediol, N,N-dimethyl acetamide, and combinations thereof. In some examples, the detailing agent can be mostly water. In a particular example, the detailing agent can be about 85 wt % to 100 wt %, or from 85 wt % to 99 wt % water. In further examples, the detailing agent can be about 95 wt % to 100 wt % water, or from 95 wt % to 99 wt %. In still further examples, the detailing agent can be substantially devoid of radiation absorbers. That is, in some examples, the detailing agent can be substantially devoid of ingredients that absorb enough radiation energy to cause the powder to fuse. In certain examples, the detailing agent can include colorants such as dyes or pigments, but in small enough amounts that the colorants do not cause the powder printed with the detailing agent to fuse when exposed to the radiation energy.

The detailing agent can also include ingredients to allow the detailing agent to be jetted by a fluid jet printhead. In some examples, the detailing agent can include jettability imparting ingredients such as those in the fusing agent described above. These ingredients can include a liquid vehicle, surfactant, dispersant, co-solvent, biocides, viscosity modifiers, materials for pH adjustment, sequestering agents, preservatives, and so on. These ingredients can be included in any of the amounts described above.

Methods of Making 3D Printed Articles

Figure 6:
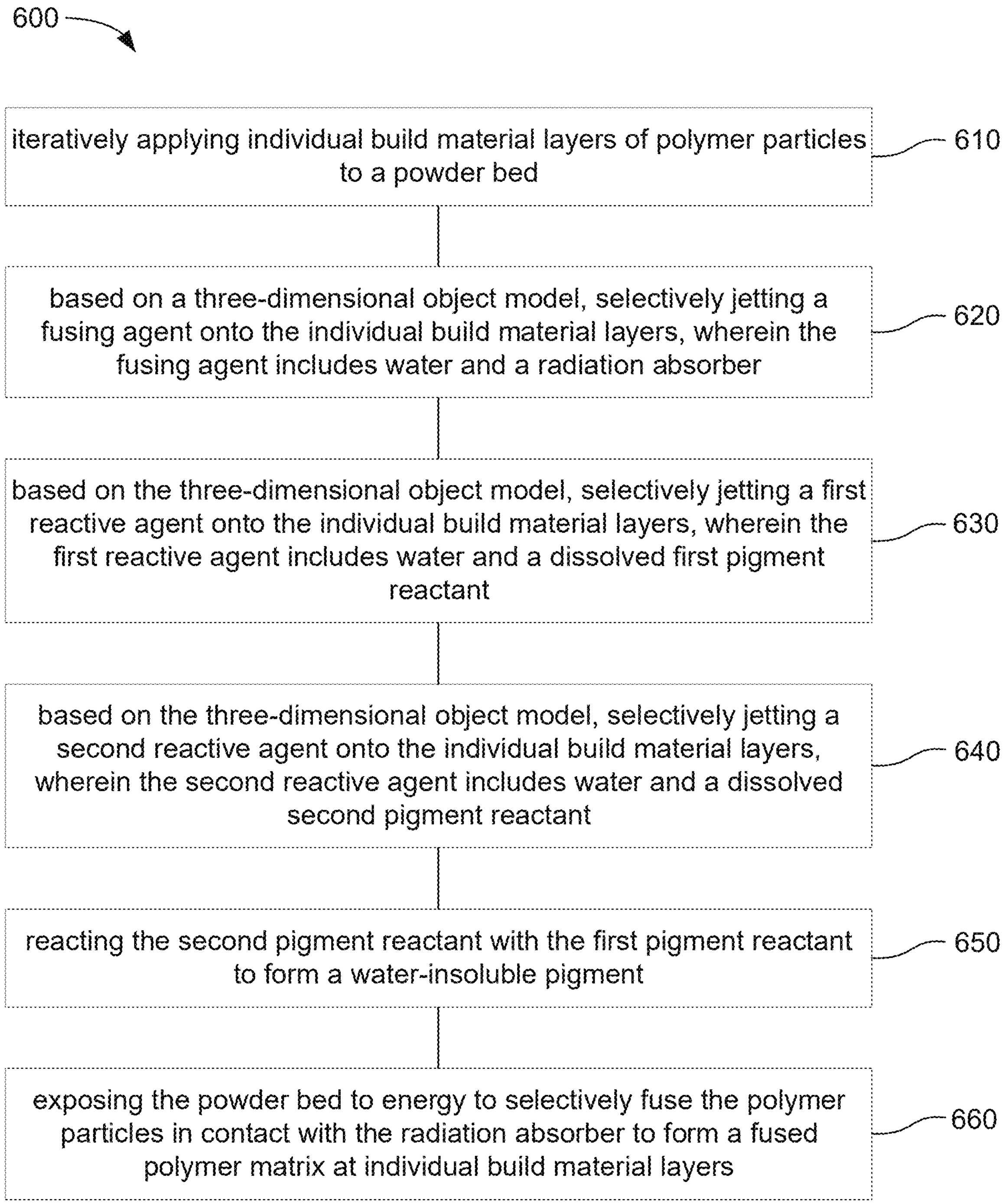
FIG. 6 is a flowchart illustrating an example method of making a three-dimensional printed article in accordance with examples of the present disclosure.

The present disclosure also describes methods of making three-dimensional printed articles. FIG. 6 shows a flowchart illustrating one example method 400 of making a three-dimensional printed article. The method includes: iteratively applying individual build material layers of polymer particles to a powder bed 610; based on a three-dimensional object model, selectively jetting a fusing agent onto the individual build material layers, wherein the fusing agent includes water and a radiation absorber 620; based on the three-dimensional object model, selectively jetting a first reactive agent onto the individual build material layers, wherein the first reactive agent includes water and a dissolved first pigment reactant 630; based on the three-dimensional object model, selectively jetting a second reactive agent onto the individual build material layers, wherein the second reactive agent includes water and a dissolved second pigment reactant 640; reacting the second pigment reactant with the first pigment reactant to form a water-insoluble pigment 650; and exposing the powder bed to energy to selectively fuse the polymer particles in contact with the radiation absorber to form a fused polymer matrix at individual build material layers 660. The powder bed material, fusing agent, and reactive agents can have any of the ingredients and properties described above.

In some examples, the first and second reactive agents can be jetted onto an area of the powder bed where the fusing agent is also jetted. When the powder bed is irradiated, the radiation absorber from the fusing agent can heat the area of the powder bed so that the polymer particles fuse together to form a solid polymer matrix. The in-situ formed pigment particles from the first and second reactive agents can be locked in place in the solid polymer matrix at this point.

In other examples, the first and second reactive agents can be jetted on an area where no fusing agent is jetted. In some cases, the water-insoluble pigment formed from the first and second reactive agents can itself function as a radiation absorber so that the neighboring polymer particles can be fused when the powder bed is irradiated. In other examples, the first and second reactive agents can be jetted onto a relatively smaller area of the powder bed that is surrounded by fusing agent. When the powder bed is irradiated, there can be sufficient heat by conductance from the surrounding powder to fuse the powder that has the first and second reactive agents jetted thereon.

In some examples, a detailing agent can also be jetted onto the powder bed. As described above, the detailing agent can be a fluid that reduces the maximum temperature of the polymer powder on which the detailing agent is printed. In particular, the maximum temperature reached by the powder during exposure to electromagnetic energy can be less in the areas where the detailing agent is applied. In certain examples, the detailing agent can include a solvent that evaporates from the polymer powder to evaporatively cool the polymer powder. The detailing agent can be printed in areas of the powder bed where fusing is not desired. In particular examples, the detailing agent can be printed along the edges of areas where the fusing agent is printed. This can give the fused layer a clean, defined edge where the fused polymer particles end and the adjacent polymer particles remain unfused. In other examples, the detailing agent can be printed in the same area where the fusing agent is printed to control the temperature of the area to be fused. In certain examples, some areas to be fused can tend to overheat, especially in central areas of large fused sections. To control the temperature and avoid overheating (which can lead to melting and slumping of the build material), the detailing agent can be applied to these areas The fusing agent and detailing agent can be jetted onto the powder bed using fluid jet print heads. The amount of the fusing agent used can be calibrated based the concentration of radiation absorber in the fusing agent, the level of fusing desired for the polymer particles, and other factors. In some examples, the amount of fusing agent printed can be sufficient to contact the radiation absorber with the entire layer of polymer powder. For example, if individual layers of polymer powder is 100 microns thick, then the fusing agent can penetrate 100 microns into the polymer powder. Thus the fusing agent can heat the polymer powder throughout the entire layer so that the layer can coalesce and bond to the layer below. After forming a solid layer, a new layer of loose powder can be formed, either by lowering the powder bed or by raising the height of a powder roller and rolling a new layer of powder.

In some examples, the entire powder bed can be preheated to a temperature below the melting or softening point of the polymer powder. In one example, the preheat temperature can be from about 10° C. to about 30° C. below the melting or softening point. In another example, the preheat temperature can be within 50° C. of the melting of softening point. In a particular example, the preheat temperature can be from about 160° C. to about 170° C. and the polymer powder can be nylon 12 powder. In another example, the preheat temperature can be about 90° C. to about 100° C. and the polymer powder can be thermoplastic polyurethane. Preheating can be accomplished with a lamp or lamps, an oven, a heated support bed, or other types of heaters. In some examples, the entire powder bed can be heated to a substantially uniform temperature.

The powder bed can be irradiated with a fusing lamp. Suitable fusing lamps for use in the methods described herein can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure needed to coalesce individual printed layers. The fusing lamp can be configured to irradiate the entire powder bed with a substantially uniform amount of energy. This can selectively coalesce the printed portions with fusing agent leaving the unprinted portions of the polymer powder below the melting or softening point.

In one example, the fusing lamp can be matched with the radiation absorber in the fusing agent so that the fusing lamp emits wavelengths of light that match the peak absorption wavelengths of the radiation absorber. A radiation absorber with a narrow peak at a particular near-infrared wavelength can be used with a fusing lamp that emits a narrow range of wavelengths at approximately the peak wavelength of the radiation absorber. Similarly, a radiation absorber that absorbs a broad range of near-infrared wavelengths can be used with a fusing lamp that emits a broad range of wavelengths. Matching the radiation absorber and the fusing lamp in this way can increase the efficiency of coalescing the polymer particles with the fusing agent printed thereon, while the unprinted polymer particles do not absorb as much light and remain at a lower temperature.

Depending on the amount of radiation absorber present in the polymer powder, the absorbance of the radiation absorber, the preheat temperature, and the melting or softening point of the polymer, an appropriate amount of irradiation can be supplied from the fusing lamp. In some examples, the fusing lamp can irradiate individual layers from about 0.5 to about 10 seconds per pass.

The 3D printed article can be formed by jetting a fusing agent onto layers of powder bed build material according to a 3D object model. 3D object models can in some examples be created using computer aided design (CAD) software. 3D object models can be stored in any suitable file format. In some examples, a 3D printed article as described herein can be based on a single 3D object model. In certain examples, the 3D object model can define the three-dimensional shape of the article and the three-dimensional shape of areas of the powder bed to be jetted with detailing agent. In other examples, the article can be defined by a first 3D object model a second 3D object model can define areas to jet the detailing agent. In further examples, the jetting of the detailing agent may not be controlled using a 3D object model, but using some other parameters or instructions to the 3D printing system. Other information may also be included in 3D object models, such as structures to be formed of additional different materials or color data for printing the article with various colors at different locations on the article. The 3D object model may also include features or materials specifically related to jetting fluids on layers of powder bed material, such as the desired amount of fluid to be applied to a given area. This information may be in the form of a droplet saturation, for example, which can instruct a 3D printing system to jet a certain number of droplets of fluid into a specific area. This can allow the 3D printing system to finely control radiation absorption, cooling, color saturation, and so on. All this information can be contained in a single 3D object file or a combination of multiple files. The 3D printed article can be made based on the 3D object model. As used herein, "based on the 3D object model" can refer to printing using a single 3D object model file or a combination of multiple 3D object models that together define the article. In certain examples, software can be used to convert a 3D object model to instructions for a 3D printer to form the article by building up individual layers of build material.

In an example of the 3D printing process, a thin layer of polymer powder can be spread on a bed to form a powder bed. At the beginning of the process, the powder bed can be empty because no polymer particles have been spread at that point. For the first layer, the polymer particles can be spread onto an empty build platform. The build platform can be a flat surface made of a material sufficient to withstand the heating conditions of the 3D printing process, such as a metal. Thus, "applying individual build material layers of polymer particles to a powder bed" includes spreading polymer particles onto the empty build platform for the first layer. In other examples, a number of initial layers of polymer powder can be spread before the printing begins. These "blank" layers of powder bed material can in some examples number from about 10 to about 500, from about 10 to about 200, or from about 10 to about 100. In some cases, spreading multiple layers of powder before beginning the print can increase temperature uniformity of the 3D printed article. A fluid jet printing head, such as an inkjet print head, can then be used to print a fusing agent including a radiation absorber over portions of the powder bed corresponding to a thin layer of the 3D article to be formed. Then the bed can be exposed to electromagnetic energy, e.g., typically the entire bed. The electromagnetic energy can include light, infrared radiation, and so on. The radiation absorber can absorb more energy from the electromagnetic energy than the unprinted powder. The absorbed light energy can be converted to thermal energy, causing the printed portions of the powder to soften and fuse together into a formed layer. After the first layer is formed, a new thin layer of polymer powder can be spread over the powder bed and the process can be repeated to form additional layers until a complete 3D article is printed. Thus, "applying individual build material layers of polymer particles to a powder bed" also includes spreading layers of polymer particles over the loose particles and fused layers beneath the new layer of polymer particles.

Definitions

It is noted that, as used in this specification and the appended claims, the singular forms "a," "an," and "the" include plural referents unless the context clearly dictates otherwise.

As used herein, "colorant" can include dyes and/or pigments.

As used herein, "dye" refers to compounds or molecules that absorb electromagnetic radiation or certain wavelengths thereof. Dyes can impart a visible color to an ink if the dyes absorb wavelengths in the visible spectrum.

As used herein, "pigment" generally includes pigment colorants, magnetic particles, aluminas, silicas, and/or other ceramics, organo-metallics or other opaque particles, whether or not such particulates impart color. Thus, though the present description mentions pigment colorants, the term "pigment" can be used more generally to describe pigment colorants, and also other pigments such as organometallics, ferrites, ceramics, etc. In one specific aspect, however, the pigment is a pigment colorant. A "pigment reactant" on the other hand is not a pigment per se, but rather a component that reacts with another "pigment reactant" to form a pigment.

As used herein, "ink jetting" or "jetting" refers to compositions that are ejected from jetting architecture, such as ink-jet architecture. Ink-jet architecture can include thermal or piezo architecture. Additionally, such architecture can be configured to print varying drop sizes such as less than 10 picoliters, less than 20 picoliters, less than 30 picoliters, less than 40 picoliters, less than 50 picoliters, etc.

As used herein, "average particle size" refers to a number average of the diameter of the particles for spherical particles, or a number average of the volume equivalent sphere diameter for non-spherical particles. The volume equivalent sphere diameter is the diameter of a sphere having the same volume as the particle. Average particle size can be measured using a particle analyzer such as the Mastersizer™ 3000 available from Malvern Panalytical. The particle analyzer can measure particle size using laser diffraction. A laser beam can pass through a sample of particles and the angular variation in intensity of light scattered by the particles can be measured. Larger particles scatter light at smaller angles, while small particles scatter light at larger angles. The particle analyzer can then analyze the angular scattering data to calculate the size of the particles using the Mie theory of light scattering. The particle size can be reported as a volume equivalent sphere diameter.

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context. When using the term "substantial" or "substantially" in the negative, e.g., substantially devoid of a material, what is meant is from none of that material is present, or at most, trace amounts could be present at a concentration that would not impact the function or properties of the composition as a whole.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though members of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include the numerical values explicitly recited as the limits of the range, and also to include individual numerical values or sub-ranges encompassed within that range as if numerical values and sub-ranges are explicitly recited. As an illustration, a numerical range of "about 1 wt % to about 5 wt %" should be interpreted to include the explicitly recited values of about 1 wt % to about 5 wt %, and also to include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

EXAMPLES

The following illustrates examples of the present disclosure. However, it is to be understood that the following are merely illustrative of the application of the principles of the present disclosure. Numerous modifications and alternative devices, methods, and systems may be devised without departing from the spirit and scope of the present disclosure. The appended claims are intended to cover such modifications and arrangements.

Example 1

An example first reactive agent was formulated as a 0.02 M solution of $FeSO_4$ in deionized water. An example second reactive agent was formulated as a 0.08 M solution of $K_3[Fe(CN)_6]$ in an aqueous inkjet vehicle. The two reactive agents were loaded into a test 2D inkjet printer and printed on paper to test the jettability of the reactive agents. The two reactive agents were found to be highly jettable. The first and second reactive agents were printed on top of one another on a paper, and the area where both reactive agents were printed showed a blue color. This indicates the formation of the Prussian blue pigment.

Example 2

The first and second reactive agents from Example 1 were then tested in a 3D printing process. The reactive agents were loaded in an HP Multi Jet Fusion 3D™ test printer. The fusing agent used included a carbon black pigment as a radiation absorber. In order to make the Prussian blue pigment easy to see, the first and second reactive agents were printed on areas where no fusing agent was printed. A 3D object model was designed for an article made up of a square shaped block of polymer fused with the fusing agent with the word "BLUE" formed by the reactive agents on one surface of the block. The 3D printed article was successfully printed, and the powder where the reactive agents were printed was fused or partially fused by heat conducted from surrounding polymer where the fusing agent was printed. The word "BLUE" appeared in a blue color on the 3D printed block, indicating that the Prussian blue pigment formed where the first and second reactive agents were printed.

What is claimed is:

1. A method of making a three-dimensional printed article, comprising:

iteratively applying individual build material layers of polymer particles to a powder bed;

based on the three-dimensional object model, selectively jetting a first reactive agent onto the individual build material layers, wherein the first reactive agent comprises water and a first pigment reactant dissolved in the water;

based on the three-dimensional object model, selectively jetting a second reactive agent onto the individual build material layers, wherein the second reactive agent comprises water and a second pigment reactant dissolved in the water;

reacting the dissolved second pigment reactant with the dissolved first pigment reactant to form an infrared absorbing water-insoluble pigment selected from the group consisting of barium white and Prussian blue; and exposing the powder bed to infrared radiation to selectively fuse the polymer particles in contact with the infrared absorbing water-insoluble pigment to form a fused polymer matrix at individual build material layers.

2. The method of claim 1, wherein:

the water-insoluble pigment is the barium white;

the first pigment reactant is $BaCl_2$; and the second pigment reactant is $Na_2SO_4$.

3. The method of claim 1, wherein:

the water-insoluble pigment is the Prussian blue;

the first pigment reactant is $FeSO_4$; and the second pigment reactant is $K_3[Fe(CN)_6]$.

4. The method of claim 1, wherein:

the first pigment reactant is present at a concentration ranging from about 0.01 mol/L to about 0.5 mol/L with respect to a volume of the first reactive agent; and the second pigment reactant is present at a concentration ranging from about 0.01 mol/L to about 0.5 mol/L with respect to a volume of the second reactive agent.

5. The method of claim 1, further comprising selectively jetting, based on the three-dimensional object model, a detailing agent to the individual build material layers around edges of an area where first and second reactive agents are selectively applied.

6. A method of making a three-dimensional printed article comprising:

applying an individual build material layer of polymer particles to a powder bed;

based on a three-dimensional object model, selectively jetting a fusing agent onto a portion of the individual build material layer, wherein the fusing agent comprises water and a radiation absorber;

based on the three-dimensional object model, selectively jetting a first reactive agent onto an other portion of the individual build material layer, wherein the first reactive agent comprises water and a first pigment reactant dissolved in the water, and wherein the portion surrounds the other portion;

based on the three-dimensional object model, selectively jetting a second reactive agent onto the other portion of the individual build material layer, wherein the second reactive agent comprises water and a second pigment reactant dissolved in the water;

reacting the second pigment reactant with the first pigment reactant to form a water-insoluble pigment at the other portion of the individual build material layer, wherein the water-insoluble pigment includes iron oxide red, barium white, basic copper carbonate, zinc chrome yellow, or Prussian blue; and exposing the individual build material layer to energy to selectively fuse the polymer particles at the portion, whereby the other portion at least partially fuses by heat conductance from the portion.

7. The method of claim 6, wherein the fusing agent is colorless.

8. The method of claim 6, wherein:

the water-insoluble pigment is the barium white;

the first pigment reactant is $BaCl_2$; and the second pigment reactant is $Na_2SO_4$.

9. The method of claim 6, wherein:

the water-insoluble pigment is the Prussian blue;

the first pigment reactant is $FeSO_4$; and the second pigment reactant is $K_3[Fe(CN)_6]$.

10. The method of claim 6, wherein:

the water-insoluble pigment is the iron oxide red;

the first pigment reactant is $FeSO_4$; and the second pigment reactant is NaOH.

11. The method of claim 6, wherein:

the water-insoluble pigment is the basic copper carbonate;

the first pigment reactant is $CuSO_4$; and the second pigment reactant is $Na_2CO_3$.

12. The method of claim 6, wherein:

the water-insoluble pigment is the zinc chrome yellow;

the first pigment reactant is $K_2CrO_4$; and the second pigment reactant is $ZnSO_4$.

* * * * *